Patented Mar. 7, 1944

2,343,252

UNITED STATES PATENT OFFICE 2,343,252

FLUORO-HALOGENO COMPOUNDS

Anthony F. Benning, Woodstown, N. J., assignor to Kinetic Chemicals, Inc., Wilmington, Del., a corporation of Delaware No Drawing. Application February 18, 1941, Serial No. 379,473

11 Claims. (Cl. 260—653)

This invention relates to a process for the making of fluoro-halogeno hydrocarbons by the reaction of a hydrogen halide with fluoro hydrocarbons in the presence of a catalyst.

The fluoro-halogeno hydrocarbons have come into great prominence recently because of their adaptability to a great variety of uses, notable among which are their excellence as refrigerants.

Because of the high utility of the fluoro-halogeno hydrocarbons, it is an object of this invention to provide a new and flexible process for making them. A specific object of the invention is to provide a process capable of producing 1,1,2,2-tetrafluoro-1-chloro ethane. Other objects of the invention will be in part apparent and in part set forth hereinafter.

The objects of the invention are accomplished by reacting a fluoro hydrocarbon with a hydrogen halide, preferably hydrogen chloride, in the vapor phase in the presence of a catalyst being a manganese phosphate, preferably at those temperatures and pressures in each instance which produce the optimum yield of the desired end product and the minimum yield of unwanted by-products. The temperatures and pressures which produce optimum results will vary according to the compound being produced, but the examples hereinafter set forth will sufficiently indicate the nature of the variables and the manner of their variation to enable any person skilled in the art to apply the invention in the most satisfactory manner to any selected product.

The catalysts used in the process are manganese phosphates, which are sometimes of unknown constitution but which are prepared in general by the reaction of manganese compounds, such as manganese dioxide, with a reactive acid of phosphorus. The reaction product of manganese dioxide and phosphoric acid, which was prepared at a temperature of 800° C., has particularly marked catalytic properties for the addition of hydrochloric acid to fluoro-halogeno hydrocarbons. This product is probably a complex mixture of manganese phosphates.

This invention is more particularly directed to the production of fluoro-halogeno hydrocarbons from mono-olefines which are gaseous at ordinary temperature and pressure though it is not limited thereto and may be applied to the treatment of liquid olefines as well with proper modifications in treating conditions with respect to the temperature, the length of the time of contact, and the phase of the olefines. The process may be employed to produce acyclic hydrocarbons containing halogen and fluorine from individual olefines or from mixtures of the same with each other.

This invention involves passing proportioned mixtures of the vapors of a fluoro-olefine or fluoro-halogeno-olefine and hydrogen chloride through solid contact material consisting of manganese salts in a form presenting an expansive surface to the reactive gas mixture. These catalysts may also be used on supporting materials having a very high porosity, such as is known to exist in silica gel, active charcoal and some of the naturally occurring highly porous earthy materials. The vapors may be premixed or led separately into the reaction chamber, and may be preheated although that is not necessary. After passing through the reaction tube, the effluent gases may be purified, cooled and liquefied, and the unchanged raw materials recovered for repassing over the catalyst.

The reaction tube may be made out of various materials. Glass, quartz, carbon and metal tubes have been used. Carbon, silver and platinum lined tubes have been most advantageously used. In most cases, they are preferred although base metal tubes may be used.

While the invention is susceptible of considerable variation and modification in the manner of its practical application, particularly as regards the nature and proportion of the reactants, the temperature, pressure and exact method of procedure, the following examples, run at one atmosphere pressure, unless otherwise specified, and in which the parts are by weight, will serve to illustrate how the invention may be practiced. In these examples are set forth several of the preferred embodiments of the invention, but they are presented only for purposes of illustration and not as a limitation.

Example I

About 26 parts of manganese dioxide and 9 parts of 85% ortho-phosphoric acid are slowly heated until, at about 800° C., a friable violet mass was obtained, being a complex manganese salt containing about 25% manganese and 24% phosphorus, which was sized, material between 20 and 30 mesh being set apart for use as a catalyst.

About 41 parts of $C_2F_4$ and 30 parts of anhydrous HCl were slowly passed through the manganese salt catalyst, prepared as set out in the preceding paragraph, contained in a silver tube at such a rate as to maintain a contact time of about 20 seconds. The temperature was kept at about 300° C. The initial conversion was about 100% $C_2HClF_4$, and was maintained for about 17 hours.

Example II

About 87 parts of manganese dioxide ($MnO_2$) and 132 parts of diammonium acid phosphate were made into a paste, and heated to redness in an evaporating dish. A friable violet mass and a light grey mass were obtained. These two materials were manually separated and the 20—30 mesh portions thereof separated.

The violet manganese salt was placed in a silver tube and kept at a temperature of about 300° C. About 49 parts of $C_2F_4$ and 36 parts of anhydrous HCl was passed through the catalyst at a rate giving a contact time of about 18 seconds. A conversion of about 30% to $C_2HClF_4$ was obtained for the first few hours, but a gradual drop lowered the rate to about 20% after 24 hours.

*Example III*

The light grey material described in Example II was used as a catalyst under the conditions of Example II. The conversion to $C_2HClF_4$ at the start of the run was about 20% and remained practically constant for 24 hours.

Doubling the time of contact raised the conversion to about 24%.

*Example IV*

About 50 parts of $C_2F_4$ and 57 parts of anhydrous HCl were slowly passed through 20—30 mesh $MnSO_4$ contained in a silver tube. A temperature of 300° C. and a contact time of about 20 seconds were maintained for a run of 24 hours. The initial conversion of about 12% $C_2HClF_4$ was maintained throughout the run.

By raising the contact time to about 38 seconds the initial conversion to $C_2HClF_4$ was raised to 21%.

The temperature and pressure used in effecting the addition may vary within wide limits, the general degree of limitation being the point of decomposition of any reactants. Temperatures of 400° C. have been found satisfactory. Higher temperatures when they do not cause decomposition may be used, but the preferred temperature range is between 150° C. and 400° C. for the making of $C_2HClF_4$. For the production of $CHF_2$—$CF_2Cl$, temperatures around 280° C. to 375° C. have been found satisfactory. Satisfactory results have been obtained with the use of pressures ranging from one to ten atmosphere abs. although pressures greater or less are suitable, the controlling factor in the choice of the pressure and temperature being the attainment of high yields of a desired compound with the minimum of undesirable by-product formation. The addition process according to this invention may also be carried out by mixing or distributing the metallic salt catalyst over or throughout an inert or relatively inert material having a preferably good heat conductivity. Extenders of this type are silica gel, active carbon, sintered alumina or similar materials. Various concentrations of the catalysts may be used on these extenders. The contact time used may also vary according to the reactants and the proportions of the reactants used. Generally speaking, it is preferable to employ a contact time of about 10 to 120 seconds but other times of contact may be used. The reacting gases need not be of high purity, provided specific catalyst poisons are not present.

The process of effecting the addition of the hydrogen chloride to the olefines and the substituted olefines is generally useful, examples of which are the following unsaturated compounds: $CF_2=CFCl$, $CCl_2=CF_2$, $CFCl=CFCl$, $CHF=CCl_2$, $CHCl=CHF$. The various products obtained in carrying out the invention find application for various commercial purposes. Some of them are excellent refrigerants and solvents. Thus, 1,1,2,2-tetrafluoro-1-chloro ethane has properties very desirable in a refrigerant, it and many of the other products formed having been found to be odorless, non-inflammable, non-corrosive and non-toxic.

The present invention is notable as a means of obtaining these fluoro halogeno compounds in much higher yields and without undesirable side reactions. The catalysts of the present invention are relatively cheap to prepare, and sufficiently resistant to the action of hydrogen chloride.

As many apparently widely different embodiments of this invention may be made without departing from the spirit and scope thereof, it is to be understood that I do not limit myself to the specific embodiments thereof except as defined in the appended claims.

I claim:

1. An addition process for the manufacture of fluoro-halogeno hydrocarbons which comprises reacting hydrogen chloride with a fluoro olefine in the presence of a catalyst comprising a manganese phosphate at elevated temperature and at superatmospheric pressure.

2. An addition process for the manufacture of fluoro-halogeno hydrocarbon which comprises reacting hydrogen chloride with a fluoro olefine in the presence of a catalyst comprising a manganese phosphate at elevated temperature.

3. An addition process for the manufacture of fluoro-halogeno hydrocarbons which comprises reacting hydrogen chloride with a fluoro olefine in the presence of a catalyst comprising a manganese phosphate at super-atmospheric pressure.

4. An addition process for the manufacture of $C_2HClF_4$ which comprises reacting $C_2F_4$ with HCl in the presence of a catalyst being the product of the reaction of manganese dioxide with orthophosphoric acid.

5. The process which comprises reacting hydrogen chloride with a fluoro-ethylene in the presence of a catalyst comprising manganese phosphate at elevated temperature and at super-atmospheric pressure.

6. The process which comprises reacting hydrogen chloride with a fluoro-ethylene in the presence of a catalyst comprising a manganese phosphate at elevated temperature.

7. The process which comprises reacting hydrogen chloride with a fluoro-ethylene in the presence of a catalyst comprising a manganese phosphate at super-atmospheric pressure.

8. The process which comprises reacting hydrogen chloride with a fluoro-ethylene in the presence of a catalyst comprising a manganese phosphate.

9. The process which comprises reacting hydrogen chloride with a fluoro-mono-olefine in the presence of a manganese phosphate catalyst.

10. The process which comprises reacting hydrogen chloride with a fluoro-mono-olefine which is gaseous at ordinary temperature and pressure in the presence of a manganese phosphate catalyst.

11. The process of adding the elements HCl to a fluorine-containing mono-olefine which comprises reacting HCl with a fluorine-containing mono-olefine in the presence of a manganese phosphate catalyst under those conditions of temperature and pressure which are efficient.

ANTHONY F. BENNING.